United States Patent [19]

Hartman

[11] Patent Number: 4,911,018

[45] Date of Patent: Mar. 27, 1990

[54] FLOW METER BRACKET

[76] Inventor: Doanld R. Hartman, 311 Honey Locust Ct., Seffner, Fla. 33584

[21] Appl. No.: 340,369

[22] Filed: Apr. 19, 1989

Related U.S. Application Data

[63] Continuation-in-part of Ser. No. 158,872, Feb. 23, 1988, abandoned.

[51] Int. Cl.[4] .......................... G01F 1/68; G01F 15/18
[52] U.S. Cl. ................................ 73/861.12; 73/272 R
[58] Field of Search ........... 73/272 R, 861.12, 861.15, 73/861.16; 174/78, 84 S; 285/19, 30, 31, 61, 64; 439/100

[56] References Cited

U.S. PATENT DOCUMENTS

| | | | |
|---|---|---|---|
| 3,745,824 | 7/1973 | Mannherz et al. | 73/861.12 |
| 4,399,315 | 8/1983 | Iida | 174/848 |
| 4,419,899 | 12/1983 | Wada | 73/861.12 |
| 4,549,751 | 10/1985 | Grove, Jr. | 285/61 |
| 4,635,162 | 1/1987 | McLauglin | 174/845 |

FOREIGN PATENT DOCUMENTS 3340458  5/1985  Fed. Rep. of Germany ... 73/861.12

*Primary Examiner*—Herbert Goldstein
*Attorney, Agent, or Firm*—Dominik, Stein, Saccocio, Reese, Colitz & Van Der Wall

[57] ABSTRACT

An improved bracket apparatus for measuring the flow rate of a fluid comprising an inlet conduit and an outlet conduit for the passage of fluid therethrough. Each conduit has a flange with bolt holes therein. The apparatus also includes a magnetic flowtube having an orifice for the passage of fluid therethrough. The input and output ends of the flowtube each having a flange with bolt holes therein aligned with the bolt holes of the conduits. Electrically conductive brackets are positioned between the ends of the flowtube and the adjacent ends of the conduits with each bracket having an aperture in axial alignment with the orifices of the flowtube and the conduits. Each bracket also has bolt holes extending therethrough axially aligned with bolt holes of the flowtube and the conduits. The brackets are of a size and shape for providing a support for the flow meter. Electrically conductive bolts extend through the bolt holes of the flowtube and the brackets to define an electrically conductive grounding path between the flowing fluid to the flowtube. Also disclosed is the method of measuring the flow rate with the apparatus.

11 Claims, 4 Drawing Sheets

FLOW METER BRACKET

CROSS-REFERENCE TO RELATED APPLICATION

This application is a continuation in part of U.S. patent application Ser. No. 07/158,872 filed 2/23/88 in my name now abandoned.

BACKGROUND OF THE INVENTION

This invention relates to a flow meter bracket and, more particularly, to improved brackets for supporting the ends of a magnetic flow tube type flow meter with respect to incoming and outgoing fluid conduits and for establishing an electrical ground between the flow meter housing and the fluid flowing therethrough.

DESCRIPTION OF THE BACKGROUND ART

A magnetic flowtube is one type of flow meter used in industry today for determining the flow rate or velocity of fluid moving in a path of travel through the flow meter and coupled conduits. The principle of operation of magnetic flowtubes is based on Farada's Law of electromagnetic induction. Specifically, the voltage (Vo) induced in a conductor of length (De) is proportional to the De multiplied by the velocity (v) of the conductor and the intensity (T) of the magnetic field. That is, $Do = (De)(v)(T)$.

In this application of Faraday's Law, the process fluid is the conductor. The process fluid passes through the magnetic field induced by coils built around a section of the metering tube. The process fluid is electrically insulated from the metering tube by the lining of the tube. Two metallic electrodes are mounted in the flowtube, and voltage is developed across these electrodes which is directly proportional to the average velocity of liquid passing through the magnetic field.

Flowtube coils may be energized by AC or pulsed DC power. The magnetic field and resultant induced voltage is AC. The voltage signal is shielded from interference, amplified and demodulated into a standard DC current signal by a magnetic flow transmitter. The accuracy of the measurement, however, can only be as accurate as the reference potential. In other words, the flow of fluid must be grounded with respect to the flow meter conduit if an accurate reading is to be generated.

In known devices, the grounding of the process fluid with respect to the flow meter was effected by electrically conductive brackets in the shape of flat rings positioned between the input and output flanges of the flow meter and the input and output flanges of the conduits coupled thereto. The rings were of a limited size to be totally within the confines of the coupling bolts. Gaskets were positioned adjacent to the flanges on opposite sides of the rings. A single extension leg extending radially beyond the flanges was formed integrally with the ring and an electrical wire was coupled to form the leg to a bolt in electrical communication with the flow meter conduit.

The installation of such known flow meters required simultaneous assembly with at least seven separate elements: the flow meter, two grounding rings and four gaskets. The installation work was complicated by the cold flowing of the liner flange which protruded about one-half inch from the metering tube. Damage to the liner flange often occurred during assembly.

Also in the known flow meters, the grounding ring was often connected to rusty flange bolts reducing the quality of conductivity. Additionally, the protruding leg of the grounding ring constituted a safety hazard. Further, the construction of known grounding rings provided no support to the flow meters in which they were utilized.

Performance is improved when grounding is through a plurality of conductive bolts rather than through a single wire which continuously deteriorates. Further, a single round wire has a greater chance of being accidentally torn off by adjacent objects. Further yet, maintenance people could inadvertently couple the single wire to improper elements. Such problems are precluded with a multiple bolt grounding arrangement which is, in effect, tamper-proof and error-proof.

The background art discloses a wide variety of brackets, connectors and supports for use in association with a wide variety of flow meters. For example, in U.S. Pat. No. 3,931,672 to Merritt et al, a mounting plate is provided to mount duct sections. The plate may be formed integral with, or may be rigidly attached to, the installation in which the ducts are to be used. The outer periphery of the plate is shown to be generally circular.

In U.S. Pat. No. 3,575,214 to Bindel, an insulating hanger assembly is provided for supporting an insulating pipe or the like. The hanger comprises a support bracket interposed between pipe ends.

Leopold et al, in U.S. Pat. No. 3,746,371, shows a fluid meter including a bracket which embraces pipe joints. The bracket is sheet metal and is capable of attachment to a wall or post. The bracket permits the use of conventional elbows and straight flow meter swivel members for properly orienting and supporting the flow meter.

In a further patent, U.S. Pat. No. 4,458,866 to Gravens, a support system is disclosed for providing thermal insulation at a pipe joint. The supported chamber contains exhaust gas at a pressure at or slightly above ambient. The flanges are in a fixed position relative to the front frame. Thermal growth is thus permitted to extend in the direction along the length of the pipes.

A corrosion proof flow meter with pipe supports is disclosed in U.S. Pat. No. 3,347,568 to Weeden et al. The flow meter has a fluorocarbon liner concentrically spaced within a tubular joint. The liner is secured to the interior surface of the joint near each end thereof with a flared portion intermediate at the ends protruding through an aperture of the tubular joint. A bolt and nut force a fluorocarbon conical region having a probe member projecting therethrough into seating engagement with the flared protrusion of the liner.

Cook in U.S. Pat. No. 3,194,590 discloses a combination pipe hanger and coupler wherein a bracket embraces a pipe joint.

Lastly, U.S. Pat. No. 3,910,608 to Phillips discloses a hub for connecting electrical conduit to the top of a terminal box.

None of these prior patents discloses flow meter brackets for connecting the input and output ends of a flow meter with input and output conduits through grounding bolts whereby a free-standing support for the flow meter is formed by the brackets in association with the grounding of the fluid to the flow meter conduit.

Although many such advances are noteworthy to one extent or another, no background patent or other background disclosure teaches or suggests the reliable, convenient and economic supporting of a flow meter in association with the electrical grounding of fluids flowing therethrough.

As illustrated by the great number of prior patents, disclosures and commercial devices, efforts are continuously being made in an attempt to more efficiently support and ground flow meters. No prior effort, however, suggests the present inventive combination of method steps and component elements arranged and configured for supporting flow meters and grounding their fluid a disclosed and claimed herein. Prior methods and devices do not provide the benefits attendant with the present invention. The present invention achieves its intended purposes, objects and advantages over the prior methods and devices through a new, useful and unobvious combination of component steps and elements, through the use of a minimum number of functioning parts, at a reduction in cost to manufacture, install, repair and operate and through the utilization of only readily available materials and conventional components.

It is, therefore, an object of the present invention to provide a mask couplable to the end of the flow meter for supporting the flow meter and for electrically grounding the flow meter with respect to the fluid flowing therethrough. The flow meter is of the type having an orifice for the passage therethrough of fluid, the flow rate of which is to be measured. The mask comprises a rigid, electrically conductive, metallic plate having a central aperture extending therethrough and positionable with the central aperture being in axially aligned relationship with the orifice of the flow meter, the mask also having a plurality of bolt holes spaced from the axis of the central aperture for receiving electrically conductive bolts extending through a flange of the flow meter to be coupled to the flow meter, the central aperture of the mask being of a diameter essentially equal to the orifice of the flow meter and the conduit whereby an electrically conductive grounding path will extend from the fluid to the interior edge of the aperture of the mask through the bolt holes and bolts to the flange of the flow meter. The mask is rectangular with its edges located a distance from the axis of the central aperture greater than the exterior of the flow meter. The mask further includes additional bolt holes for coupling the mask to other objects. The additional bolt holes are positioned as translations of the template of the apertures in the flanges to be supported thereby. The mask further including end portions extending at right angles from the remainder of the mask.

It is also an object of the present invention to provide an apparatus for measuring the flow rate of a fluid comprising an inlet conduit and an outlet conduit for the passage of fluid therethrough. Each conduit has a flange with bolt holes therein equally spaced from the axis of the conduits, a magnetic flowtube which has an orifice for the passage of fluid therethrough, the input and output ends of the flowtube each has a flange with bolt holes therein aligned with the bolt holes of the conduits, and electrically conductive brackets positioned between the ends of the flowtube and the adjacent ends of the conduits. Each bracket has a fluid flow aperture in axial alignment with the orifices of the flowtube and the conduits as well as bolt holes extending therethrough axially aligned with bolt holes of the flowtube and the conduits. The brackets are rectangular in configuration with their edges located a distance from the axis of the orifice greater than the exterior of the flowtube for providing support for the flow meter. Electrically conductive bolts extend through the bolt holes of the flowtube and the brackets and the conduits to define an electrically conductive grounding path from the internal edge of each aperture through its associated bracket, bolts and flowtube. Gaskets are positioned on each side of each bracket to provide liquid tight connections between the brackets and the adjacent conduit and flowtube ends. The liner flange is effectively out of reach of damaging tools during removal and installation.

It is a further object of the present invention to provide a method of supporting and grounding a flow meter comprising the steps of providing brackets on opposite ends of the flow meter in operative association with conduits to be coupled with respect thereto, and coupling the flow meter with the brackets therebetween by electrically conductive bolts adapted to support the weight of the flow meter when the brackets are supported on a surface and also for establishing an electrically conductive grounding path between the flow meter and fluid flowing therethrough through the bolts and brackets.

A further object of the invention is to support the opposite ends of a flowmmeter with brackets which ground the fluid with respect to the flow meter conduit.

Yet a further object of the invention is to ground flow meter conduits with respect to the fluid passing therethrough concurrently with their support.

Lastly, it is an object of the present invention to support and ground flow meters more reliably, conveniently and economically.

The foregoing has outlined some of the more pertinent objects of the invention. These objects and advantages should be construed to be merely illustrative of some of the more prominent features and applications of the intended invention. Many other beneficial results can be attained by applying the disclosed invention in a different manner or by modifying the invention within the scope of the disclosure. Accordingly, other objects and a fuller understanding of the invention may be had by referring to the preferred embodiment in addition to the scope of the invention defined by the claims taken in conjunction with the accompanying drawings.

SUMMARY OF THE INVENTION

The present invention is defined by the appended claims with the specific embodiment shown in the attached drawings. For the purposes of summarizing the invention, the invention may be incorporated into a mask for coupling to an end of a flow meter of the type having an orifice for the passage therethrough of fluid. The flow rate of this fluid is to be measured. The mask is couplable to the end of the flow meter for supporting the flow meter and for electrically grounding the flow meter with respect to the fluid flowing therethrough. The mask comprises a rigid, electrically conductive, metallic plate having a central aperture extending therethrough and positionable with the central aperture being in axially aligned relationship with the orifice of the flow meter. The mask also has a plurality of bolt holes spaced from the axis of the central aperture for receiving electrically conductive bolts extending through a flange of the flow meter to be coupled to the flow meter. The central aperture of the mask is of a diameter essentially equal to the orifice of the flow meter and the conduit whereby an electrically conductive grounding path will extend from the fluid to the interior edge of the aperture of the mask through the bolt holes and bolts to the flange of the flow meter. The mask is rectangular with its edges located a distance from the axis of the central aperture greater than the exterior of the flow meter. Additional bolt holes couple the mask to other objects. End portions extend at right angles from the remainder of the mask.

The invention may also be incorporated into an apparatus for supporting a flow meter and for grounding fluid flowing therethrough with the flow meter comprising an electrically conductive bracket positioned on opposite ends of the flow meter for coupling with flanges of pipes to be coupled. There are fluid flow apertures through each of the brackets in axial alignment with an orifice extending through the flow meter and bolt hole extending through the brackets axially aligned with apertures of the flanges of the flow meter and pipes to be coupled by the flow meter to Define an electrically conductive grounding path from the internal edge of each aperture through the bracket, bolt holes and flanges of flow meter. The assembly is such that the brackets have at least one linear supporting edge whereby the brackets may support the weight of the flow meter above a supporting surface.

Lastly, the invention may also be incorporated into a method of supporting and grounding a flow meter comprising the steps of providing brackets on opposite ends of the flow meter in operative association with pipes to be coupled, and coupling the bracket and flow meter through electrically conductive bolts adapted to support the weight of the flow meter when the brackets are supported on a surface and for also establishing a conductive grounding path from the flow meter through the bolts and brackets to the fluid flowing through the pipes, brackets and flow meter.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed herein may be readily utilized as a basis for modifying or designing other methods and constructions for carrying out the same purpose of the present invention. It should also be realized by those skilled in the art that such equivalent methods and constructions do not depart from the spirit and scope of the invention as set forth in the appended claims.

BRIEF DESCRIPTION OF THE DRAWINGS

For a more complete understanding of the nature, objects and advantages of the invention, reference should be had to the following detailed description taken in conjunction with the accompanying drawings in which.

Similar reference characters refer to similar parts throughout the several Figures.

DETAILED DESCRIPTION OF THE INVENTION

Figure 1:
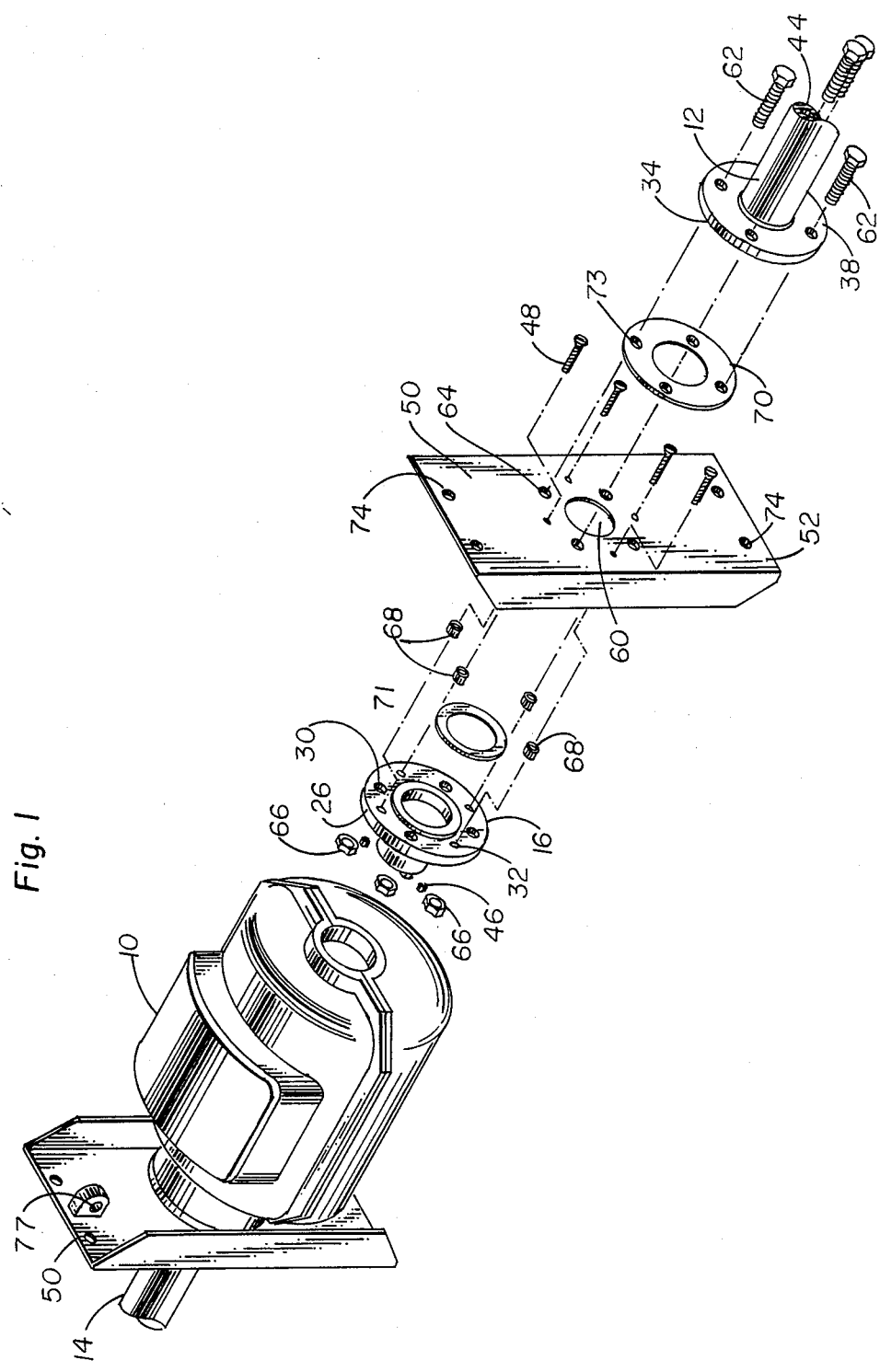
FIG. 1 is a perspective illustration of a bracket or mask constructed in accordance with the principles of the present invention.
Figure 2:
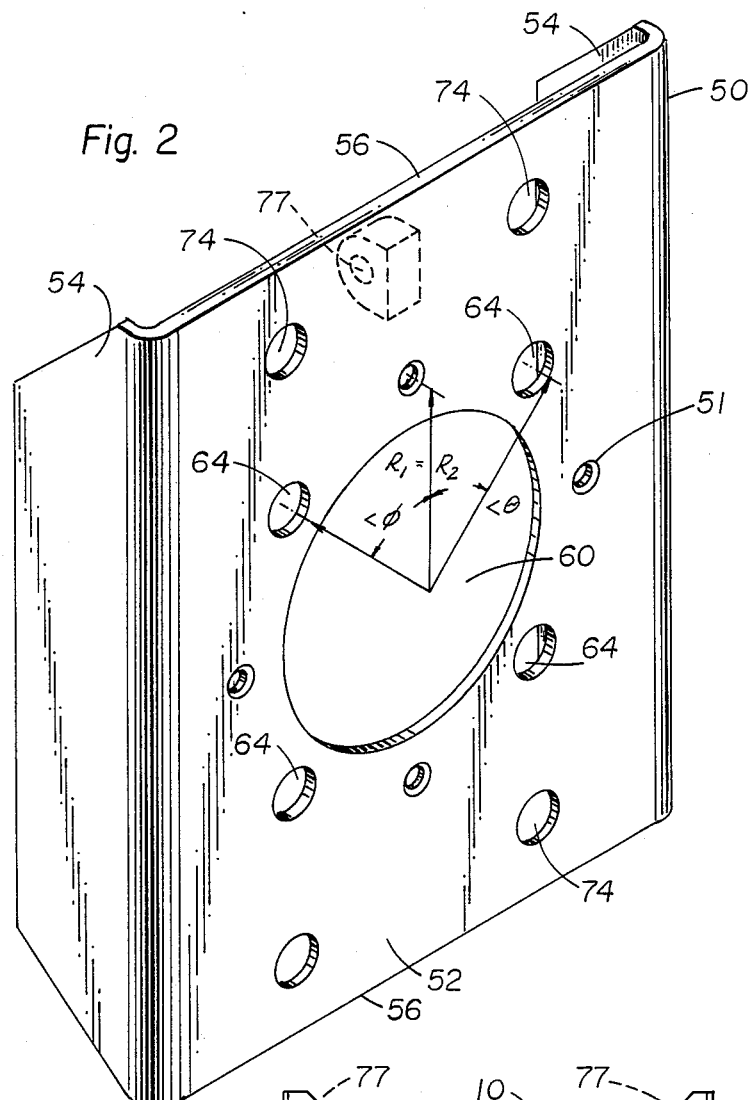
FIG. 2 is a perspective illustration of the bracket or mask of FIG. 1.
Figure 5:
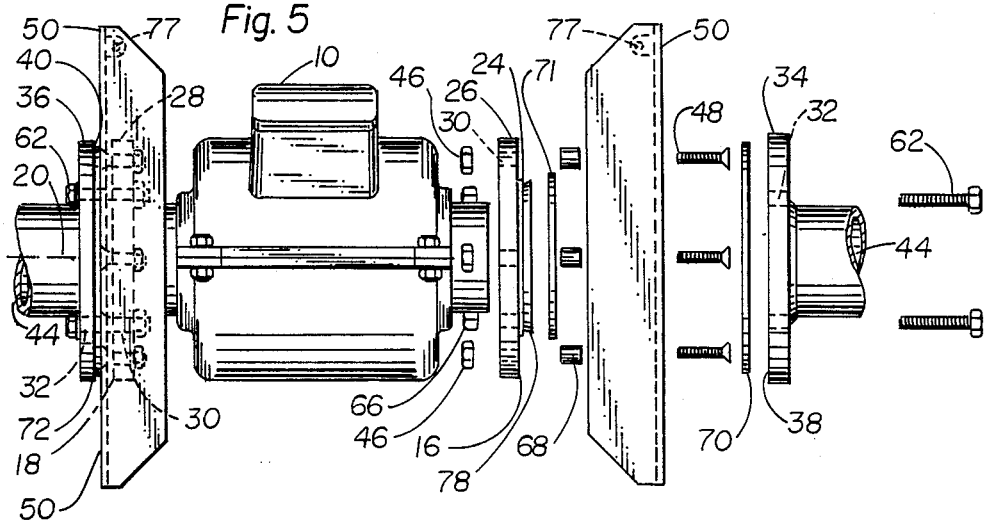
FIG. 5 is a side elevational view, partially exploded, of a flow meter, conduit and brackets constructed in accordance with the principles of the present invention.

The present invention can most readily be seen by reference to the perspective showing of FIG. 1 and the exploded showing of FIG. 5. The flow meter 10 is shown as a magnetic flowtube. It includes a main housing located in the path of travel of fluid moving between input and output pieces or conduits 12 and 14 secured to input 16 and output 18 ends of the flow meter 10. The flow meter includes electrical lines for AC power in as well as for AC power out. On the output end 18 of the flow meter is an AC millivolt signal to determine the velocity or rate of flow of the fluid passing therethrough. When the flow meter is oriented horizontally as shown in the various figures, the internal electrodes of the flow meter ar aligned with the horizontal lateral axis of the flow meter 10. In this manner, the flow meter may be rotated about its lateral axis to any rotational position, horizontally, vertically or therebetween, and still function maintaining its intended mode of operation. If the electrodes are parallel to the vertical axis, air bubbles flowing along the inside of the conduit will break the conductivity path between the electrodes thus indicating no flow on the instruments. The common axis of the electrodes must therefore be horizontal. The flowtube may thus be rotated around its lateral, horizontal axis to any position while the common axis of the electrodes remains horizontal. When in other than the vertical position, the flowtube may be rotated around its flow axis until the lateral axis is horizontal.

The flow meter is provided with a central orifice 24 therethrough and flanges 26 and 28 at its opposite ends. The flanges 26 and 28 are formed with holes 30 for coupling with bolt holes 32 in flanges 34 and 36 at the adjacent ends 38 and 40 of the conduits 12 and 14 coupled thereto. The conduits are also formed with central orifices 44 aligned with the central orifice 24 of the flow meter 10. A plurality of smaller nuts 46 and threaded members or mounting bolts 48 are disclosed in the present preferred embodiment as the mechanisms for coupling the brackets 50 to the flanges 26 and 28 of the flow meter 10 through mounting holes 51 for releasably joining the flowmmeter and brackets 50 in a fluid tight relationship.

Figure 3:
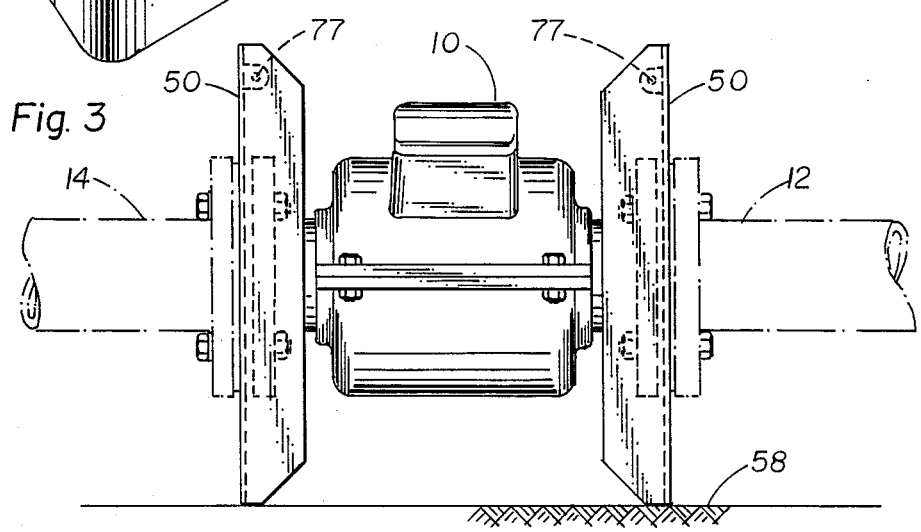
FIG. 3 is a side elevational view of the flowtube type flow meter with the brackets as shown in FIG. 1 and with associated conduits all in operative position.

Each end of the flow meter 10 is intended to be employed in association with a bracket or mask 50 constructed and installed in accordance with the present invention. The bracket includes an enlarged, flat generally rectangular central portion 52. The bracket also includes smaller end portions 54 formed integral with, and extending at essentially right angles from, the central portion 52. The end portions 54, in association with the central portion 52, provide edge surfaces 56 upon which the brackets 50 may be supported by the ground 58 beneath the flow meter 10. The height of the bracket 50 is preferably greater than the greatest dimension of the flow meter from its axis so that when brackets are placed at opposite ends of the flow meter, the brackets may physically support the flow meter above the ground. Note FIG. 3. Two brackets are preferably employed as herein disclosed. A single bracket may be utilized for support but the flow meter assembly must be normally assembled in the shop so probably two brackets would generally be used for field installation.

Each bracket is formed with a central aperture 60 of a diameter essentially equal to the diameter of the orifices of the conduits and the flow meter to which it is to be attached. The orifices 24 and 44 and central aperture 60 are preferably in axial alignment. Electrical and mechanical coupling is effected through a plurality, preferably four large flat head mounting bolts 48, positionable through a like number of mounting holes 51 peripherally aligned in a circular manner around the central aperture 60 of the bracket 50. Larger sized conduits would have a proportionately larger number of bolt holes. The number of mounting holes 51 for bolts 48 would equal the number of bracket bolt holes 64. Such bolt holes 64 of the brackets 50 are aligned with corresponding bolt holes 30 in the flanges of the flow meter 10 and bolt holes 32 of the flanges 34 and 36 of the conduits 12 and 14. Associated flange bolts 62 and nuts 66 and lock washers are utilized to effect the coupling. A plurality of flat spacers or washers 68 are located between the facing surfaces of the brackets 50 and flanges 26 and 28 of the flow meter for spacing purposes and for preventing the crushing of the liner flanges by over tightening of the bolts 62 or the weight of the conduits.

Located on exterior sides of the bracket are gaskets 70 and 72 to form a liquid seal between the brackets and the facing surfaces on the flanges of the conduits and the flow meter. Gaskets 71 are on the interior sides of the brackets. All such gaskets are of a material such as butyl or neoprene. The gaskets 70 and 72 are preferably completely circular in configuration with an enlarged exterior diameter and apertures 73 for the passage therethrough of bolts 62. As seen in FIGS. 1 and 5, the outer gaskets 70 and 72 have larger diameters than the inner gaskets 71 and cover the heads of bolts 48. The gaskets may be secured to the brackets by an adhesive. The outer gaskets 70 and 72 would not have apertures for mounting bolts 48. This would protect the bolt heads and counter sunk surface from corrosion. The gaskets 71 would be attached to the masks before mounting on the flow meter. Standard gaskets 71 would not have to be apertured for bolts 48.

In addition a sealant is preferably used to fill the space between the flowtube and mask after shop assembly to prevent the accumulation of corrosive material.

When mounted on opposite ends of the flow meter 10, the brackets 50 provide the support for the flow meter 10. The brackets 50 may be rested upon the ground 58 with the flow meter 10 there above whereby servicemen may have full access to the flow meter for repair or cleaning purposes. The flow meter 10 may be side-mounted through the brackets 50 in a horizontal or vertical or angular position and in any degree of rotation around the common axis of its electrodes. Flow meters are often mounted in vertical positions and thus carry the weight of conduits around the flow meters.

Figure 6:
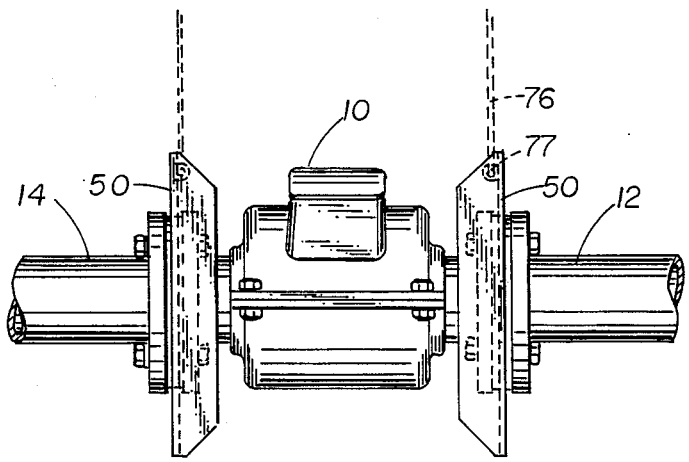
FIG. 6 is a side elevational view of the apparatus or system shown in FIG. 5 supported by hooks.

The location of mounting bolt holes in the brackets are obtained by vertical translation of flange bolt holes. Readily available standard flanges can be used as templates to locate bolt holes in the supporting structures. All basic mask bolt hole dimensions would repose in the flow meter flange. The greatest utility would be obtained by having two mounting holes 74 adjacent to the top and bottom edges 56. The two side holes are for rigid mounting while the center hole is for suspension purposes as through a suspension hook 76. Note FIG. 6. A center hole is preferably formed in a projection 77 outstanding at a right angle from the rear face of the bracket.

The mounting holes 74 would be the same size as the flange bolt holes 64. Pipe fitters usually have one size diameter assortment of bolts in their buckets for a given size pipe. They would add washers to the bolts to obtain the required tightness rather than make a trip back to the shop for the exactly required bolt. This approach would avoid aggravation to them and help ensure a properly mounted flowtube. Many washers, however, are used.

The function of the grounding is to maintain the same electrical potential between the metal conduit of the flow meter and the processing fluid flowing therethrough. An electrically insulating flowtube liner 78, as of Teflon or the like, is to protect the metal conduit of the flowtube from the effects of corrosive process fluids.

Figure 4:
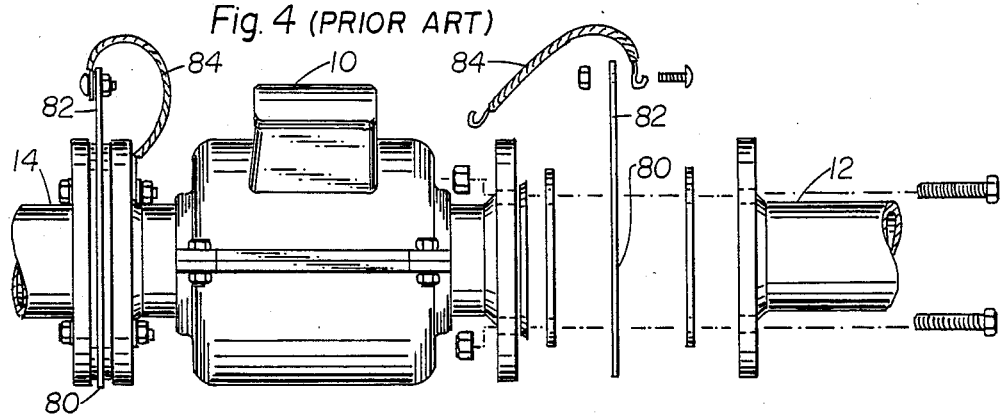
FIG. 4 is a side elevational view of a flow meter and associated conduits coupled by brackets of a prior art design.

The magnetic flowtube type flow meter of the present invention is commercially available from The Foxboro Company of Foxboro, Massachusetts. Its mode of operation and commercially available associated mechanisms are shown in FIG. 4. Such mechanisms include the flow meter 10, conduits 12 and 14, a ring-like bracket 80 with a protruding leg 82 and grounding wire 84 coupling the bracket and the flow meter. More extensive descriptions appear hereinabove and in commercially available literature of The Foxboro Company. In the prior art devices, gaps between mating flanges limit the tightening of flange bolts to prevent the breakage of fiber composition flanges. The present invention eliminates such gaps due to the use of the mask and full-face gasket on the outside allowing full torquing of the flange bolts.

Figure 7:
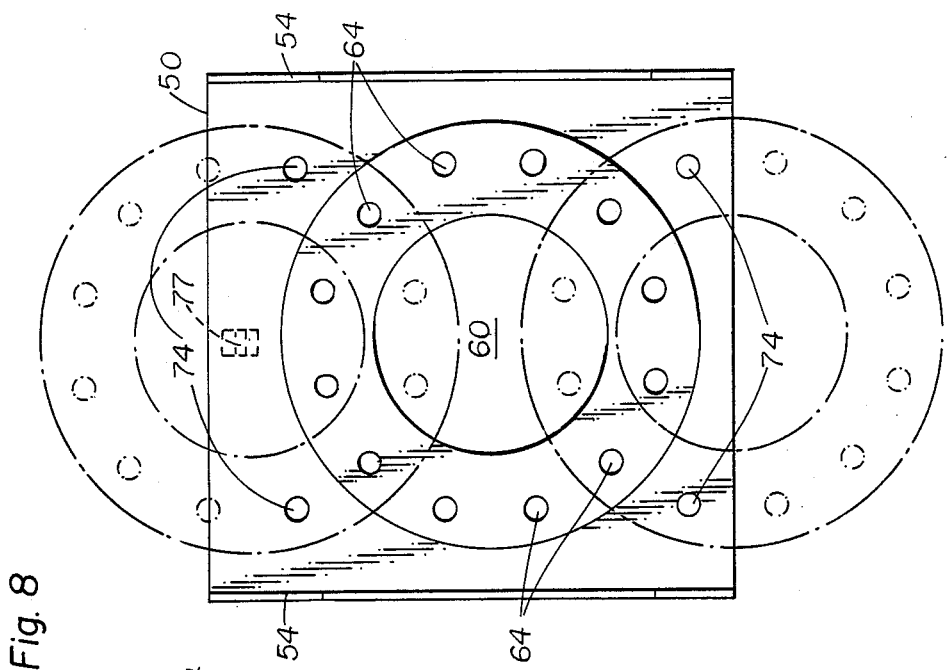
FIGS. 7 and 8 are front elevational views of a bracket with flanges of varying sized.
Figure 8:
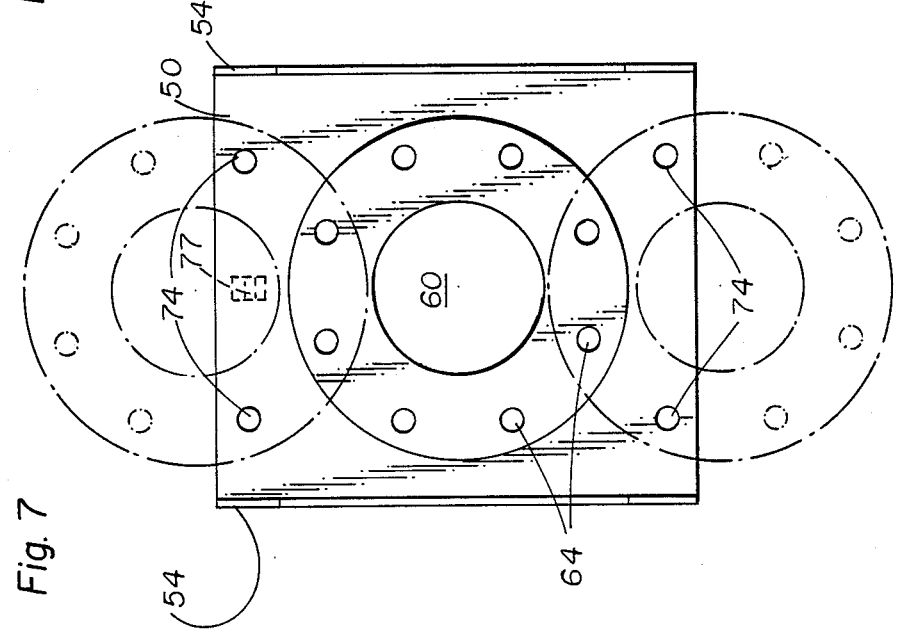

As shown in FIGS. 1, 7 and 8, various size brackets are shown as, for example, for a two inch, a six inch and a twelve inch pipe. These sizes are selected and shown for illustrative purposes only. Shown in solid lines in FIGS. 7 and 8 are the flanges of the pipes or valves with their standard hole alignment arrangement. A smaller two-inch pipe of FIG. 1, for example, has four holes which are drilled whereby four bolts may couple the pipe and valve flanges with the bracket therebetween. In FIG. 7 a six-inch pipe is utilized with six bolt holes. As mentioned hereinabove, the location of the additional mounting holes in the bracket above and below the flanges to be supported thereby. Note the dotted line configurations of FIGS. 7 and 8. The holes being as translations of the templates would allow the replacement of the bracket and, if desired, associated valves and conduits, to other locations since similar size pipes and brackets will have their support holes similarly located with respect to the conduit, bolt holes, valve and bracket. This will not affect the function on the operation of the plate, merely its support and added convenience of relocation and interchangeability.

While the present invention has been described with respect to a particular embodiment, it is not intended to be so limited. It is intended to be protected broadly within the spirit and scope of the invention.

Now that the invention has been described,
What is claimed is:

1. Apparatus for coupling a flow meter flange with a conduit flange comprising:
   a mask of an electrically conductive material positionable between the flanges of the conduit and flow meter and having a central apertures aligned with the orifices of the conduit and flow meter, a plurality of mounting holes, and a plurality of flange holes extending through the mask for coupling by flange bolts extending therethrough as well as through aligned apertures of the flanges of the conduit and flow meter;
   a gasket located on each side of the mask to provide a liquid tight seal;
   a plurality of mounting bolts extending through the mounting holes of the mask and the flange of the flow meter for electrically and mechanically coupling the mask with the flange of the flow meter;
   a plurality of spacers located between the mask and the flange of the flow meter to preclude the excess tightening of the flange of the conduit with respect to the flange of the flow meter.

2. The apparatus as set forth in claim 1 wherein the mask is rectangular with its edges located distance from the axis of the central aperture greater than the exterior of the flow meter.

3. The apparatus as set forth in claim 2 and further including additional bolt holes for coupling the mask to supporting braces and other structures and objects.

4. The apparatus as set forth in claim 3 wherein the additional bolt holes are positioned as translations of the template of the apertures in the flanges to be supported thereby.

5. The apparatus as set forth in claim 4 wherein the central additional bolt hole is on projection at right angles to the other additional bolt holes.

6. The apparatus as set forth in claim 2 and further including end portions extending at right angles from the remainder of the mask.

7. Apparatus for measuring the flow rate of a fluid comprising:
   an inlet conduit and an outlet conduit for the passage of fluid therethrough and with each conduit having a flange with bolt holes therein equally spaced from the axis of the conduits;
   a magnetic flowtube having an orifice for the passage of fluid therethrough, the input and output ends of the flowtube each having a flange with bolt holes therein aligned with the bolt holes of the conduits;
   electrically conductive brackets positioned between the ends of the flowtube and the adjacent ends of the conduits, each bracket having a fluid flow aperture in axial alignment with the orifices of the flowtube and the conduits, each bracket also having bolt holes extending therethrough axially aligned with bolt holes of the flowtube and the conduits, the brackets being rectangular in configuration with their edges located a distance from the axis of the orifice greater than the exterior of the flowtube for providing a support for the flow meter;
   electrically conductive bolts extending through the bolt hole of the flowtube and the brackets to define an electrically conductive grounding path from the internal edge of each aperture through its associated bracket, bolts and flowtube; and
   gaskets positioned on each side of each bracket to provide liquid tight connections between the brackets and the adjacent conduit and flowtube ends.

8. The apparatus as set forth in claim 7 and further including additional bolt holes extending through the brackets with flange bolts extending therethrough and with spacers on the mounting bolts between the brackets and the flowtube flanges.

9. The apparatus as set forth in claim 8 wherein the gaskets between the conduit and the brackets are not apertured for the passage of the electrically conductive bolts, but are apertured for the mounting bolts.

10. The apparatus as set forth in claim 7 wherein the gaskets, brackets, conduits and flow meter have central apertures with a common diameter for the flow of fluid therethrough.

11. The apparatus as set forth in claim 8 wherein the gaskets are secured to the brackets by an adhesive.

* * * * *